3,493,622
Patented Feb. 3, 1970

3,493,622
PURIFICATION OF DIPHENYLOL PROPANE
Jackie Ornstein, Laval, Quebec, and Walter Manylo, Ville St. Michel, Quebec, Canada, assignors to Gulf Oil Canada Limited, Toronto, Ontario, Canada, a corporation of Canada
No Drawing. Filed Jan. 6, 1967, Ser. No. 607,623
Int. Cl. C07c 37/22
U.S. Cl. 260—619     8 Claims

ABSTRACT OF THE DISCLOSURE

Process for purifying 2,2-(4,4'-dihydroxydiphenyl) propane (diphenylol propane) by solid-liquid extraction using as extractant a mixture of 2,2,4-trimethylpentane (isooctane) and an aromatic hydrocarbon liquid solvent, in one or more extraction stages; purification is improved by extracting diphenylol propane cooled slowly from molten state to a coarse granular form.

This invention relates to the purification of 2,2-(4,4'-dihydroxydiphenyl) propane. More particularly it relates to a method of obtaining very high purity 2,2-(4,4'-dihydroxydiphenyl) propane by means of a solid-liquid extraction using a particular mixture of solvents.

2,2 - (4,4' - dihydroxydiphenyl) propane, commonly called diphenylol propane and hereinafter generally referred to by this name, is usually prepared by the condensation of acetone with an excess of phenol in the presence of a strong acid catalyst at temperatures of about 20–100° C. A number of impurities are formed during the reaction and these include materials such as the orthopara isomer of diphenylol propane, that is 2,2-(2,4'-dihydroxydiphenyl) propane, dimers of the reaction intermediate isopropylol phenol (called "co-dimer" and "ortho-dimer") and a condensation product of acetone and phenol in a molar ratio of 2:3 (called "BPX").

There are many patents relating to the purification of diphenylol propane. The extent of the purification necessary depends on the quality of material required, the criteria for the degree of purity of the compound generally being freezing point and amount of color present. High purity diphenylol propane, preferably having a freezing point of 157° C. and a colour value of less than 10 APHA, is of particular use in the preparation of polycarbonate resins. It can also be used advantageously in the production of epoxy resins as colour of the final product is of importance and is affected by the purity of the diphenylol propane used.

Some of the methods which have been suggested for the purification of diphenylol propane are recrystallization from phenol, alkaline water treatment, formation of various adducts of diphenylol propane with subsequent separation and decomposition of the adducts, control of crystallization of the phenol adduct in the production of diphenylol propane, and recrystallization from or extraction with certain organic solvents. The incorporation of a solvent extraction step into the process for the production of diphenylol propane appears to be the most satisfactory method of purification, benzene, substituted benzenes, and certain chlorinated aliphatic hydrocarbons being the most suitable of the solvents hitherto proposed. However, none of the solvent systems of the prior art has ideal extraction properties.

Using the method of purification hereinafter described it has been found that diphenylol propane of very high purity can be obtained by solid-liquid extraction employing a mixed solvent system consisting of benzene or equivalent aromatic hydrocarbon liquid and 2,2,4-trimethylpentane (hereinafter generally referred to briefly as isooctane). Equivalent aromatic hydrocarbon liquids, for the purposes of this invention, are those aromatic hydrocarbon liquids which are solvents for diphenylol propane to an extent similar to that of benzene, and include particularly toluene, xylenes, and triisopropylbenzene. Reference fuel grade isoocatane is a highly satisfactory ingredient as the isoocatane constituent of the mixed solvent system for this invention. The advantages of this particular solvent composition are that it is an extractant in which the ortho-para isomer of diphenylol propane is preferentially soluble to a high degree, the solubility of other impurities it is desired to extract is high, and the solubility of diphenylol propane is moderate. It enables more complete removal of the ortho-para isomer and other impurities with less yield loss than other solvents which have been suggested for purification of this material. In fact, using this particular solvent system, it is possible to upgrade diphenylol propane of freezing point 156° C. to very high purity material of freezing point 157° C. and colour value of much less than 10 APHA.

The invention thus consists in a process for the purification of crude 2,2-(4,4'-dihydroxydiphenyl) propane, said 2,2-(4,4'-dihydroxydiphenyl) propane being obtained from the reaction of acetone with phenol, which comprises (1) Contacting the crude 2,2-(4,4'-dihydroxydiphenyl) propane in at least one extraction stage with a mixed solvent system consisting of benzene or equivalent aromatic hydrocarbon liquid and a proportion of 2,2,4-trimethylpentane effective preferentially to dissolve impurities from the crude material, and (2) Subsequently recovering purified 2,2-(4,4'-dihydroxydiphenyl) propane.

In the development of the present invention it has been discovered that:

(1) The solubility of diphenylol propane in benzene is high, and is greater than that of the ortho-para isomer of diphenylol propane, the ratio of the two being about 1.0:0.65; the solubility of diphenylol propane in issoctane is relatively low, being only about 30% of that in benzene; surprisingly, the solubility of the ortho-para isomer in issoctane is high, being about nine times as great as that of diphenylol propane; however, despite the greater solubility of the ortho-para isomer in isooctane, this solvent alone is not an efficient extractant for extraction of the ortho-para isomer from diphenylol propane.

(2) A combination of isooctane and benzene or equivalent aromatic hydrocarbon liquid has the optimum extraction properties; it has been noted, for example, that with a mixture of equal volumes of the two solvents isooctane and benzene the ratio of the solubility of the ortho-para isomer to that of diphenylol propane is about four to one, the solubility of diphenylol propane is about 45% that in pure benzene and, in addition, other impurities are highly soluble in the mixture. The use of isooctane-benzene mixed solvent makes possible an extraction procedure which incorporates a low yield loss with the desired degree of purification without requiring a large number of extraction stages, as compared to the use of isooctane alone which entails a prohibitive number of extraction stages, or the use of benzene alone which involves high yield losses without preferential extraction of the ortho-para isomer and other impurities.

It has been observed that to obtain diphenylol propane of the highest possible purity by this procedure it is first necessary to ensure that the crude compound is in coarse granular form. This can be achieved by, for instance, slow cooling of molten diphenylol propane, e.g. over a period of several minutes, to form large crystals which for convenience can be crushed and screened to provide material for particle size between about 0.5 and 5.0 mm., preferably between about 1.0 and 2.0 mm.

Effective relative proportions of isooctane and aromatic hydrocarbon liquid are those which provide appropriate selective solvent action on the impurities in the diphenylol propane by the mixed solvent system; obviously the proportion is governed to some extent by the nature of the specific aromatic hydrocarbon used in the mixed solvent. Generally, proportions of 25–75% by volume of isooctane and correspondingly 75–25% by volume of aromatic hydrocarbon in the mixture are suitable but other proportions may be preferred for specific mixed solvents. A preferred mixed solvent is a mixture of 40–60% isooctane and correspondinglyly 60–40% benzene, and the most preferred mixture is equal volumes of isooctane and benzene. When benzene is used as the aromatic hydrocarbon liquid, with less than about 40% isooctane in the mixture the preferential solubility of the ortho-para isomer is not sufficient to give good results and the yield losses are high because of the increased amount of benzene present; with more than about 60% isooctane in the mixture the preferential solubility of the ortho-para isomer is increased but the solubility of diphenylol propane is decreased and the extraction procedure consequently requires an undesirably large number of stages.

Other mixtures of solvents such as pentane-benzene and cyclohexanone-benzene were not found to be satisfactory as the desirable extraction properties of the isooctane-benzene system were absent and no improvement over the use of pure benzene was observed.

The extraction procedure of this invention is preferably carried out at ambient i.e. room temperature. Increasing the temperature is not desirable as at higher temperature the solubility of diphenylol propane increases giving increased yield losses. No advantage is gained by decreasing the temperature as method of cooling are then required and the solubilities of the various components to be extracted are decreased.

The ratio of solvent to solid used in any particular extraction stage is preferably from about 1.5:1 to 5:1 by weight and most preferably is about 3:1. Increased yield losses occur when the ratio of solvent to solid is high; when the ratio is low more stages are required in the extraction procedure. Therefore, a ratio of 3:1 is considered the most advantageous.

The extraction can be carried out by means of a single stage or multistage batch procedure or a multistage countercurrent extraction. The number of stages used depends on the degree of purity required for the final product. Using crude coarse granular material of freezing point 156° C. it has been found that about five stages in a batchwise procedure or six in a multistage countercurrent procedure are sufficient to give material of freezing point 157° C. and colour of less than 10 APHA.

The following examples serve to illustrate the application of the invention but it is not intended that the invention be limited in scope by these examples.

The diphenylol propane which was used as the starting material in the following examples was prepared by the condensation of acetone with phenol using hydrogen chloride as catalyst, the procedure including temperature and time controls in order to obtain some isomerization of by-product ortho-para isomer formed to the desired para-para isomer (diphenylol propane). The hydrogen chloride and excess phenol were distilled off under vacuum and final traces of phenol removed from the product by steam stripping. The product was obtained as flaked material by a method of rapid cooling.

Diphenylol propane of freezing point 156° C. or better is obtained from the foregoing procedure. However, it is not intended that the invention be limited to purification of diphenylol propane of freezing point 156° C. prepared by this specific procedure as it is applicable to any crude diphenylol propane resulting from the condensation of acetone with phenol.

ANALYSIS OF CRUDE DIPHENYLOL PROPANE USED IN EXAMPLES

| Component: | Weight percent |
|---|---|
| p-Phenylphenol | trace |
| Ortho-dimer | trace |
| Ortho-para isomer of diphenylol propane | 1.18 |
| Co-dimer | 0.04 |
| Diphenylol propane | 98.65 |
| BPX | 0.13 |
| Freezing point | ° C.__ 156.2 |

Freezing point determinations were carried out by placing a test tube containing the sample and a calibrated thermometer in a bath consisting of domestic paraffin oil. After heating the bath to 165–170° C., it was allowed to cool at such a rate that the bath temperature stayed 5° C. below the sample temperature. The sample temperature levelled off and remained steady for at least one minute either after initially falling continuously or showing a slight rise after the continuous fall. The freezing point was recorded as the temporarily steady temperature.

APHA colour values were determined as the colour of a 15% w./v. solution of the product in ethanol denatured with methanol compared to standards prepared by dilution of APHA platinum-cobalt standard #500. Determinations of the concentrations of diphenylol propane and impurities were carried out by means of gas-liquid chromatography. All analytical determinations on material treated by solvent extraction were carried out after drying of the sample under vacuum at 50° C.

EXAMPLE 1

50 grams of diphenylol propane (rapidly cooled flaked material) prepared as described above was contacted in a beaker with 150 grams of mixed solvent, consisting of 50% isooctane-50% benzene by volume, for a period of 20 minutes at room temperature using gentle stirring. Twenty minutes was found to be adequate for extraction equilibrium to be reached. The solvent was then separated by vacuum filtration, any losses of solvent to the vacuum pump being made up with fresh material. For this example, one sample was extracted once as above, a second sample extracted twice, and so on up to a total of seven extraction stages. Results were as follows:

| Number of Extractions | Residual ortho-para isomer concentration, wt. percent | Freezing point, ° C. |
|---|---|---|
| 0 | 1.18 | 156.2 |
| 1 | 0.79 | |
| 7 | 0.60 | 156.6 |

Residual values for the ortho-para isomer indicate the degree of purification being attained; however, the freezing point does not depend solely on these values but also on the concentrations of other impurities.

In all extractions using the procedure of Example 1 and isooctane-benzene mixed solvent it was impossible to obtain a freezing point greater than 156.6° C. An extraction procedure was carried out in the same manner using pure benzene as the solvent, a maximum freezing point of 156.6° C. for the final product also being obtained but with undesirably high yield losses.

The foregoing example shows that the mixed solvent of the present invention is a better extractant of impurities from crude diphenylol propane flakes than is benzene in that the yield loss to the mixed solvent is much less although the degrees of purification achieved by the two solvent systems, as indicated by freezing point determinations, are comparable.

EXAMPLE 2

Diphenylol propane prepared as previously described was remelted and cooled very slowly over a period of about ten minutes to form large crystals. The crystals were then crushed and screened, material of about 1–2 mm. size being retained for the extraction. Batchwise extraction was carried out exactly as described in Example 1 using 50% isooctane-50% benzene solvent. The results were as follows:

| Number of Extractions | Residual ortho-para isomer concentration, wt. percent | Freezing point, ° C. |
|---|---|---|
| 0 | 1.18 | 156.2 |
| 1 | 0.38 | 156.8 |
| 5 | 0.36 | 157.0 |

Colour after 5 extractions: <10 APHA.

These results show that a freezing point of 157° C. is obtained in five batchwise extractions with the mixed solvent, providing that the crude material has been crystallized slowly to produce large crystals which are screened to appropriate size for the extraction. However, fewer extraction stages can be used depending on the purity required.

Coarse granular diphenylol propane was also extracted by a batch procedure exactly as previously described in this example but using pure benzene as the solvent. The results were as follows:

| Number of Extractions | Residual ortho-para isomer concentration, wt. percent | Freezing point, ° C. |
|---|---|---|
| 0 | 1.18 | 156.2 |
| 1 | 0.47 | |
| 5 | 0.38 | 156.8 |

A freezing point better than 156.8° C. was not obtained using pure benzene as solvent. A comparison of the materials extracted by the two different solvent systems showed:

| Component | Proportions of Materials Extracted using— | |
|---|---|---|
| | Isooctane-benzene (50:50/v) | Benzene |
| X1,* wt. percent | 0.02 | |
| p-Phenylphenol, wt. percent | 0.46 | 0.20 |
| X2,* wt. percent | 0.02 | 0.01 |
| Ortho-dimer, wt. percent | 0.92 | 0.37 |
| X3,* wt. percent | 0.01 | 0.01 |
| Ortho-para isomer, wt. percent | 74.44 | 28.40 |
| Co-dimer, wt. percent | 8.00 | 3.40 |
| Diphenylol propane, wt. percent | 13.90 | 66.65 |
| Z,* wt. percent | 2.40 | 0.86 |
| X4,* wt. percent | 0.004 | 0.001 |
| BPX, wt. percent | 0.13 | 0.10 |
| X5* | Trace | Trace |
| Total wt. of extracted material, g. | 0.7766 | 1.7489 |
| Recovery of diphenylol propane, percent | 98.45 | 96.5 |

*impurities of unknown composition.

As shown by these results the ortho-para isomer of diphenylol propane is much more soluble in the mixed isooctane-benzene solvent than is diphenylol propane; however, this is not the case with benzene. The freezing point and colour values for diphenylol propane depend not only on the amount of ortho-para isomer present but also on the amounts of other impurities. The foregoing results also show that the various other impurities are more soluble in the mixed solvent than in benzene. The yield loss when using the mixed solvent is much less than for benzene alone, the loss of diphenylol propane to the solvent being 1.55% for the mixed solvent as compared to 3.5% for benzene.

EXAMPLE 3

A simulated countercurrent extraction train was prepared for the extraction of diphenylol propane with isooctane-benzene (50:50/v.) mixed solvent in order to obtain a material balance and an indication of the operation conditions at each stage. A batchwise train was first prepared, the extractions all being carried out as in the previous examples using coarse granular diphenylol propane prepared as previously described. A portion of diphenylol propane, labeled A, first was extracted once with solvent, a second, labeled B, twice with fresh solvent, and so on up to a fifth portion E which was extracted five times with fresh solvent. Next fresh solvent was fed countercurrently through the five portions successively in a train from E to A and then to a new sample, numbered 1, which was added to the train. Portion E was removed from the train, a second sample, numbered 2, was added adjacent to sample 1, and fresh solvent was fed through the train starting at portion D and finishing with sample 2. This was continued until a multistage countercurrent train was prepared. It was found that six stages were required to obtain a product with freezing point 157° C. The results of the countercurrent process were as follows:

| Sample | Number of Extractions | Ortho-para wt. Percent | Diphenylol Propane, wt. Percent | F. Pt., ° C. |
|---|---|---|---|---|
| 1 | 6 | 0.38 | 99.62 | 157.0 |
| 2 | 5 | 0.38 | 99.62 | 156.9 |
| 3 | 4 | 0.38 | 99.62 | 156.9 |
| 4 | 3 | 0.42 | 99.58 | 156.9 |
| 5 | 2 | 0.43 | 99.57 | 156.8 |
| 6 | 1 | 0.55 | 99.45 | 156.8 |
| | 0 | 1.18 | 98.65 | 156.2 |

These results indicate that the bulk of the extraction occurs in the first stage, the ortho-para content being reduced from the original value of 1.18% to 0.55%, and that, for the particular starting material used, a freezing point of 157° C. is achieved in six extraction stages.

Numerous modifications can be made in the specific expedients described without departing from the scope of the invention which is defined in the following claims.

What is claimed is:

1. In a process for the purification of crude 2,2-(4,4'-dihydroxydiphenyl) propane, said 2,2-(4,4'-dihydroxydiphenyl) propane being obtained from the reaction of acetone with phenol, which process comprises (1) contacting the crude 2,2-(4,4'-dihydroxydiphenyl) propane in at least one extraction stage with a solvent to dissolve impurities from the crude material and (2) subsequently recovering purified 2,2-(4,4'-dihydroxydiphenyl) propane, the improvement which comprises contacting the crude material in the contacting step with a solvent which is a mixture of from 25% to 75% by volume of 2,2,4-trimethylpentane and a member of the group consisting of benzene, toluene, xylene and triisopropylbenzene, the proportion of solvent to crude material being in the range from 1.5:1 to 5:1 by weight.

2. In a process as claimed in claim 1, the improvement wherein the crude 2,2-(4,4'-dihydroxydiphenyl) propane contacted in the contacting step is in coarse granular form.

3. In a process as claimed in claim 2, the improvement wherein 2,2-(4,4'-dihydroxydiphenyl) propane in coarse granular form is obtained by slow cooling of molten crude material to form large crystals and crushing and screening said crystals to between 0.5 and 5.0 mm. in size prior to extraction.

4. A process as claimed in claim 3 wherein the solvent consists of between 40% and 60% by volume of 2,2,4-trimethylpentane and correspondingly 60% to 40% of benzene.

5. A process as claimed in claim 4 wherein the solvent consists of 50% 2,2,4-trimethylpentane and 50% benzene by volume.

6. A process as claimed in claim 5 wherein the extraction is carried out at ambient room temperature.

7. A process as claimed in claim 6 wherein the ratio of solvent to solid in each extraction stage is 3:1 by weight.

8. A process as claimed in claim 7 wherein the extraction is carried out as a multistage countercurrent extraction procedure.

References Cited

UNITED STATES PATENTS 2,845,464    7/1958    Luten.
3,290,391    12/1966    Prahl et al.

LEON ZITVER, Primary Examiner

NORMAN P. MORGENSTERN, Assistant Examiner